(12) United States Patent
Scott et al.

(10) Patent No.: US 8,153,978 B1
(45) Date of Patent: Apr. 10, 2012

(54) DUAL COLOR/DUAL FUNCTION FOCAL PLANE

(75) Inventors: Basil Scott, Kapaa, HI (US); Randy Wolfshagen, Koloa, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 1104 days.

(21) Appl. No.: 11/715,617

(22) Filed: Mar. 8, 2007

Related U.S. Application Data

(60) Provisional application No. 60/779,890, filed on Mar. 8, 2006.

(51) Int. Cl.
*G01J 5/02* (2006.01)
(52) U.S. Cl. ............ 250/339.02; 250/338.1; 250/339.01
(58) Field of Classification Search ................ 250/338.1, 250/339.01, 339.02, 339.14, 342
See application file for complete search history.

(56) References Cited

U.S. PATENT DOCUMENTS

| | | | |
|---|---|---|---|
| 3,161,870 A | 12/1964 | Pincoffs | |
| 3,184,739 A | 5/1965 | Franklin et al. | |
| 3,286,955 A | 11/1966 | French et al. | |
| 3,378,835 A | 4/1968 | Mooney et al. | |
| 3,378,840 A | 4/1968 | Mooney | |
| 3,412,396 A | 11/1968 | Mooney | |
| 3,448,452 A | 6/1969 | Mooney | |
| 3,487,462 A | 12/1969 | Holberg | |
| 3,560,971 A | 2/1971 | Alsberg et al. | |
| 3,821,751 A | 6/1974 | Loos | |
| 3,981,010 A | 9/1976 | Michelsen | |
| 3,992,708 A | 11/1976 | Olsen et al. | |
| 4,866,447 A | 9/1989 | Loucks | |
| 5,099,128 A * | 3/1992 | Stettner | 250/370.11 |
| 5,120,960 A * | 6/1992 | Halvis | 250/338.4 |
| 5,449,908 A * | 9/1995 | Wadsworth et al. | 250/332 |
| 5,559,336 A * | 9/1996 | Kosai et al. | 250/370.13 |
| 5,903,659 A * | 5/1999 | Kilgore | 382/103 |
| 6,192,199 B1 * | 2/2001 | Yoshida | 396/106 |
| 6,563,947 B1 * | 5/2003 | Droste | 382/181 |
| 6,784,408 B1 * | 8/2004 | Cheung et al. | 250/201.9 |
| 7,232,999 B1 * | 6/2007 | Otten et al. | 250/338.1 |
| 7,235,785 B2 * | 6/2007 | Hornback et al. | 250/332 |
| 7,333,181 B1 * | 2/2008 | Scott et al. | 356/3.08 |
| 7,551,121 B1 * | 6/2009 | O'Connell et al. | 342/54 |
| 2004/0094717 A1 * | 5/2004 | Griffin et al. | 250/349 |

\* cited by examiner

*Primary Examiner* — David Porta
*Assistant Examiner* — Casey Bryant
(74) *Attorney, Agent, or Firm* — James Creighton Wray

(57) ABSTRACT

A single focal plane integrated circuit hybrid replaces multiple focal plane circuits and associated off-focal plane signal processing electronics. A dual function, dual color focal plane PSD sensor chip assembly includes a PSD array, a traditional pixelized camera array, a signal processing chip, and flip-chip interconnects and wirebond pads to support electronics on the signal processing chip. The camera array is made of a material sensitive to wavelengths longer than the PSD array material is sensitive to. The PSD array is disposed in the same substrate as the camera array. The PSD array tracks object locations and directs the camera array to window and zoom while capturing images. Inherent registration of PSD cells to the pixelized camera array makes responsivity map testing and spatial calibration unnecessary. Reduction in power dissipation is achieved by powering on the camera array only when the PSD detects a change in scene.

15 Claims, 1 Drawing Sheet

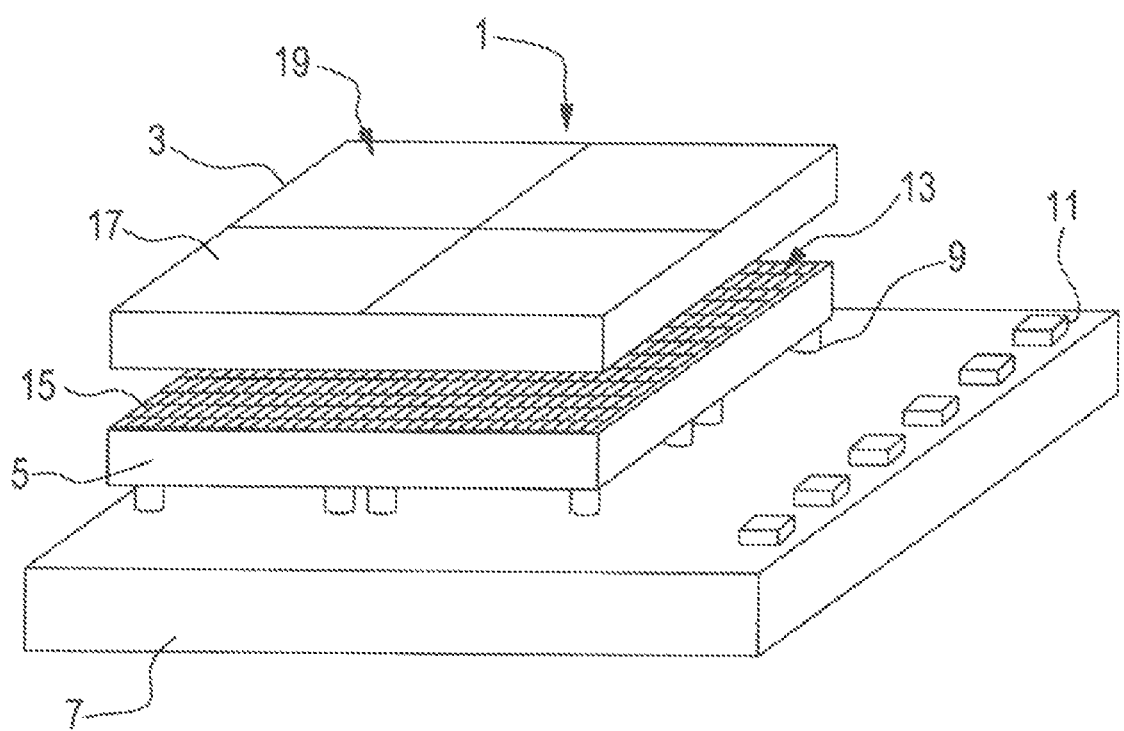

DUAL COLOR/DUAL FUNCTION FOCAL PLANE

This application claims the benefit of U.S. Provisional Application No. 60/779,890 filed Mar. 8, 2006, which is hereby incorporated by reference in its entirety.

BACKGROUND OF THE INVENTION

The invention relates to object detection, tracking and discrimination, including, but not limited to, long range detection and tracking; high-speed tracking and imaging; missile-seeker tracking and discrimination and the like.

Conventional devices primarily use pixel-based cameras for these tasks, but remain deficient for optimal detection and tracking. Deficiencies include slow tracking update rates, difficult and computationally intensive tracking/detection algorithms, power dissipation, among others.

Some missile seekers use "quad" position sensitive detector (PSD) devices, but these do not provide continuous position location or any type of imaging/discrimination capability.

Needs exist for a simple device with enhanced performance that overcomes the shortcomings of conventional devices.

SUMMARY OF THE INVENTION

The present invention meets the needs for tracking high-speed objects and real-time continuous calculation and output about object location and discrimination. The invention is an optical sensor made from semiconductor material. It combines the imaging attributes of a traditional pixelized camera sensor with the high speed, high resolution positional location properties of a PSD sensor.

Modern detector fabrication techniques are used to implement both PSD and pixelized sensors into a single sensor. At present, there is lack of acceptance to use PSD based focal planes for detection, ranging and tracking, which is uniquely provided by this invention.

The invention relates to applicant's issued patents and co-pending applications, such as, U.S. Pat. No. 6,784,408, which is incorporated herein by reference in its entirety. Also incorporated herein by reference in each of their entireties is co-pending U.S. patent application Ser. No. 11/079,145 filed Mar. 14, 2005, for "MULTI-TARGET-TRACKING OPTICAL SENSOR-ARRAY TECHNOLOGY," which is based on U.S. Provisional application Ser. No. 60/552,195 filed Mar. 12, 2004; and U.S. provisional patent application Ser. No. 60/680,742 filed May 13, 2005, for "METHODS FOR THE USE AND MANUFACTURE OF INFRARED POSITION SENSING DETECTOR FOCAL PLANE ARRAYS FOR OPTICAL TRACKING."

Applicant's Multi-target Optical Sensor Technology (MOST) is a sensor technology and method for ballistic missile defense, battlespace-awareness enhancement and multiple-target discrimination. MOST integrates key components of successful Oceanit technologies to create a unique optical sensor capability that provides highly accurate positional metrics with wide field-of-view and at high temporal bandwidth, on a fast-tracking platform. These are described in applicant's co-pending applications: Ser. No. 10/128,433 (ARRAY OF LATERAL EFFECT DETECTORS FOR HIGH-SPEED WAVE-FRONT SENSING . . . ) filed Apr. 24, 2002, now U.S. Pat. No. 6,784,408; Ser. No. 09/189,381 (PHENOMENOLOGICAL ORBIT DEBRIS) filed Jul. 8, 2002; Ser. No. 10/290,527 (AUTONOMOUS ROBOTIC TELESCOPE SYSTEM) filed Nov. 8, 2002; and Ser. No. 10/290,543 (GLOBAL SPACE ENVIRONMENT TRACKING SYSTEM) filed Nov. 8, 2002; and all claiming priority of earlier filed provisional applications. Each of those applications is incorporated herein by reference in its entirety.

A new dual function, dual color focal plane PSD sensor chip assembly has a PSD array, a traditional pixelized camera array made of standard semiconductor material, and a signal processing chip. The signal processing chip has flip-chip interconnects and wirebond pads on the signal processing chip to support electronics. Shorter wavelength infrared photons are absorbed by the PSD array, and longer wave infrared photons are absorbed by the camera array.

In a preferred embodiment, the PSD array is made of visible, short, mid, or long wavelength sensitive material. The flip-chip interconnects are indium bumps. The PSD array is disposed in the same substrate as the camera array. A preferred substrate material is HgCdTe.

The traditional pixelized camera array is made of a material sensitive to wavelengths longer than the PSD array material is sensitive to. In a preferred embodiment, the camera array has 1024×1024 pixels made from a longer wave infrared sensitive layer.

In one embodiment, a camera control mechanism uses the PSD array's calculation of object location to instruct the camera array to window and zoom, allowing production of images that accurately track objects automatically without any control from off the sensor chip assembly. Pixels of the camera array are directly below cells of the PSD array, creating inherent registration of the PSD cells and eliminating the need for a mechanism to perform responsivity map testing and calibration. The PSD array uses the signal mechanism to signal the camera array to power up when it detects an appropriate change of scene.

A new method of using the sensor chip assembly uses the PSD array to track objects while using the camera array to capture images. The images are used to perform special discrimination functions. The PSD array's calculation of object location is used to instruct the camera array to window and zoom, producing images that accurately track objects automatically, without any control from off the sensor chip assembly. The PSD cells are placed directly above the camera array pixels, inherently registering the PSD cells, eliminating responsivity map testing and calibration requirements. The PSD array signals the camera array to power up only when the PSD array detects an appropriate change of scene.

These and further and other objects and features of the invention are apparent in the disclosure, which includes the above and ongoing written specification, with the drawings.

BRIEF DESCRIPTION OF THE DRAWINGS

FIG. 1 is a Sensor Chip Assembly (SCA) with a dual PSD/Pixelized array.

DETAILED DESCRIPTION OF THE PREFERRED EMBODIMENTS

The invention provides the ability to perform high-speed tracking and detailed imaging (for discrimination and/or any other purpose) in a single system. Specifically, a single focal plane integrated circuit hybrid replaces multiple focal plane circuits and associated off-focal plane signal processing electronics.

Significant decrease in complexity and component count for multi color object detection, ranging and tracking is provided. The invention also increases the video rate associated with tracking fast moving objects because the control required to change the cameras windowing is generated automatically on focal plane. The invention allows a single system to perform functions that would require at least two systems in conventional devices.

As shown in FIG. 1, the invention is an optical sensor—a dual function, dual color focal plane PSD sensor chip assembly providing efficient optical detection, ranging, and tracking systems and components.

The SCA assembly 1 includes a PSD array 3, traditional pixelized camera array 5, signal processing chip 7, flip-chip interconnects 9, and wirebond pads 11 to support electronics. Short or mid wave infrared photons 19 are absorbed by the PSD array 3, and longer wave infrared (LWIR) photons 13 pass through and are absorbed by camera array 5. The PSD array material 3 may be made of visible, short, mid, or long wavelength sensitive material. The PSD array may advantageously be a 2×2 array of cells made from a short or mid wave infrared sensitive semiconductor layer. The PSD array may be disposed in the same substrate (for example HgCdTe or other substances) as the camera array 5. The camera array, for example, may include 1024×1024 pixels made from, for example LWIR sensitive layer. The camera array 5 would be made of a material that is sensitive to wavelengths that are longer than the PSD array 3 material. Signal processing chip 7 may be made, for example, from standard semiconductor material (example, CMOS, others). Flip-chip interconnects may, for example, be indium bumps or other material conducive for such use.

System advantages based on this focal plane invention include, but are not limited to, the following:

Auto-track and Video: The PSD's 3 inherent quick calculation of object location can be utilized to instruct the "camera" part 5 of the focal plane to perform windowing and zoom, allowing the focal plane to produce higher frame rate windowed images that accurately track objects—automatically—without any off-SCA control.

Discrimination: The PSD capability can be used to track high-speed objects while the "camera" part of the focal plane takes images to perform special discrimination functions which is very useful in missile seeker applications.

Self registration: Having the camera "pixels" 15 directly below the PSD cells 17 creates inherent registration of the PSD cells 17. This could eliminate the responsivity map testing and spatial calibration requirements associated with single format PSD detection and tracking sensors.

Lower power dissipation: Since the PSD has significantly fewer processing elements in the ROIC than does a pixelized array, there could be a considerable reduction in power dissipation by letting the PSD part of the focal plane signal the "camera" part to power up only if it detects an appropriate change of scene.

While the invention has been described with reference to specific embodiments, modifications and variations of the invention may be constructed without departing from the scope of the invention.

We claim:

1. A dual function, dual color focal plane PSD sensor chip assembly, comprising:
    a position sensitive wavefront sensor array,
    a pixelized camera array made of semiconductor material,
    a signal processing chip,
    flip-chip interconnects on the signal processing chip, and
    wirebond pads on the signal processing chip to support electronics,
    wherein short wavelength infrared photons are absorbed by the position sensitive wavefront sensor array and long wavelength infrared photons are absorbed by the camera array, and
    wherein the position sensitive wavefront sensor array is configured to permit long wavelength infrared photons to pass through the position sensitive wavefront sensor array to be absorbed by the pixelized camera array.

2. The sensor chip assembly of claim 1, wherein the position sensitive wavefront sensor array is made of visible, short, mid, and long wavelength sensitive material.

3. The sensor chip assembly of claim 1, wherein the position sensitive wavefront sensor array is disposed in a same substrate as the camera array.

4. The sensor chip assembly of claim 3, wherein the substrate is HgCdTe.

5. The sensor chip assembly of claim 1, wherein the camera array comprises pixels made from a long wave infrared sensitive layer.

6. The sensor chip assembly of claim 1, wherein the camera array is made of a material sensitive to wavelengths longer than the position sensitive wavefront sensor array is sensitive to.

7. The sensor chip assembly of claim 1, wherein the flip-chip interconnects are indium bumps.

8. The sensor chip assembly of claim 1, further comprising a camera control mechanism, wherein the camera control mechanism uses the position sensitive wavefront sensor array's calculation of object location to instruct the camera array to window and zoom, allowing production of images that accurately track objects automatically without any control from off the sensor chip assembly.

9. The sensor chip assembly of claim 1, wherein the position sensitive wavefront sensor array has cells and pixels of the camera array are directly below the cells of the position sensitive wavefront sensor array, creating inherent registration of the position sensitive wavefront sensor cells and eliminating the need for a mechanism to perform responsivity map testing and calibration.

10. The sensor chip assembly of claim 1, further comprising a signal mechanism, wherein the position sensitive wavefront sensor array uses the signal mechanism to signal the camera array to power up when it detects an appropriate change of scene.

11. A method of using the sensor chip assembly of claim 1, comprising using the position sensitive wavefront sensor array to track objects while using the camera array to capture images.

12. The method of claim 11, wherein the images are used to perform special discrimination functions.

13. A method of using the sensor chip assembly of claim 1, comprising using a calculation of object location by the position sensitive wavefront sensor array to instruct the camera array to window and zoom, producing images that accurately track objects automatically, without any control from off the sensor chip assembly.

14. A method of using the sensor chip assembly of claim 1, comprising placing position sensitive wavefront sensor cells of the position sensitive wavefront sensor array directly above camera array pixels, inherently registering the position sensitive wavefront sensor cells, eliminating responsivity map testing and spatial calibration requirements.

15. A method of using the sensor chip assembly of claim 1, comprising letting the position sensitive wavefront sensor array signal the camera array to power up only when the position sensitive wavefront sensor array detects an appropriate change of scene.

* * * * *

UNITED STATES PATENT AND TRADEMARK OFFICE
CERTIFICATE OF CORRECTION

| | | |
|---|---|---|
| PATENT NO. | : 8,153,978 B1 | |
| APPLICATION NO. | : 11/715617 | |
| DATED | : April 10, 2012 | |
| INVENTOR(S) | : Basil Scott et al. | |

It is certified that error appears in the above-identified patent and that said Letters Patent is hereby corrected as shown below:

In the Specification:

Column 1, line 4, insert the following paragraph:

--This invention was made with Government support under Contract No. HQ0006-06-D-0003-0001 awarded by the Missile Defense Agency. The Government has certain rights in this invention.--

Signed and Sealed this
Twentieth Day of May, 2014

Michelle K. Lee
*Deputy Director of the United States Patent and Trademark Office*